(12) United States Patent
Mirtsch et al.

(10) Patent No.: US 8,752,292 B2
(45) Date of Patent: Jun. 17, 2014

(54) STRUCTURED MATERIAL WEB HAVING A MULTI-DIMENSIONAL STRUCTURE, AND METHOD FOR THE PRODUCTION THEREOF

(75) Inventors: Schokufeh Mirtsch, Berlin (DE); Michael Mirtsch, Berlin (DE)

(73) Assignee: Dr. Mirtsch GmbH, Berlin (DE)

( * ) Notice: Subject to any disclaimer, the term of this patent is extended or adjusted under 35 U.S.C. 154(b) by 1211 days.

(21) Appl. No.: 12/520,589

(22) PCT Filed: Dec. 21, 2007

(86) PCT No.: PCT/DE2007/002311
§ 371 (c)(1),
(2), (4) Date: Nov. 6, 2009

(87) PCT Pub. No.: WO2008/077394
PCT Pub. Date: Jul. 3, 2008

(65) Prior Publication Data
US 2010/0058589 A1    Mar. 11, 2010

(30) Foreign Application Priority Data

Dec. 22, 2006    (DE) .......................... 10 2006 062 189

(51) Int. Cl.
     *B23P 15/16*        (2006.01)
(52) U.S. Cl.
     USPC .......................... 29/896.62; 72/325; 72/379.2

(58) Field of Classification Search
     USPC ................ 29/896.62, 6.1; 72/325, 379.2, 196
     See application file for complete search history.

(56) References Cited

U.S. PATENT DOCUMENTS

2005/0252182 A1    11/2005    Golden

FOREIGN PATENT DOCUMENTS

| | | |
|---|---|---|
| DE | 4437986 A1 | 4/1996 |
| DE | 4445669 A1 | 6/1996 |
| DE | 19951743 A1 | 5/2001 |
| EP | 06930088 B1 | 12/1997 |
| EP | 0866161 A | 9/1998 |
| EP | 1728936 A | 12/2006 |
| EP | 1728936 A3 | 5/2007 |
| JP | 2007054351 A | 3/2007 |
| WO | 03054275 | 7/2003 |

OTHER PUBLICATIONS

International Search Report (PCT/DE2007/002311).

*Primary Examiner* — Lee D Wilson
*Assistant Examiner* — Ruth G Hidalgo-Hernande
(74) *Attorney, Agent, or Firm* — Brinks Gilson & Lione (57) ABSTRACT

The invention relates to a structured material web, particularly a metal web, having a multi-dimensional structure comprising beads or creases and structures disposed next to each other and each formed by a surface section enclosed by the beads or the creases, wherein each of the structures has a dedicated location with a hole, and the surface section in every other location of the structure is formed by an incline toward the dedicated location.

11 Claims, 9 Drawing Sheets

STRUCTURED MATERIAL WEB HAVING A MULTI-DIMENSIONAL STRUCTURE, AND METHOD FOR THE PRODUCTION THEREOF

The invention relates to a structured material web having a multi-dimensional structure, and to a production method.

BACKGROUND OF THE INVENTION

Both in industry and in the domestic sector, solid particles often have to be separated from fluid media, such as gases or liquids. Examples of this are centrifugal drums, such as, for example, a washing machine drum for removing water from the clean laundry. Further examples are screen walls and filter means for filter discs, filter plates or filter drums for removing solid particles from liquid media, for example water or oil, or from gaseous media, for example smoke gases, air-conditioned air, contaminated industrial gases or compressed air. In this context, mostly, as high a degree of separation of the liquid or gaseous medium from the solid is to be attained. In order to achieve a high degree of separation, compression or acceleration forces are required which press the liquid or gaseous medium preferably through a permeable, for example holed or perforated or fine-mesh partition, for example in the form of a filter support or filter means. these compression or acceleration forces are necessary in order to accelerate the medium so as to overcome the frictional forces between the fluid, the solid particles and the wall and so as to guide the fluid through the partition on which solid particles can settle as a filter cake. If the degree of separation of the solids from the fluid is the same, the magnitude of these compression or acceleration forces required is determined essentially by the geometric configuration of the wall and of the arrangement of the holes in the partition.

One disadvantage, in this case, is, in particular, that high acceleration and compression forces subject the permeable wall, such as the filter support and filter means, to high mechanical load and, furthermore, require a high outlay in terms of energy in order to be generated.

Moreover, particularly in the chemical, pharmaceutical and gas industry, fluids have to be apportioned or metered. This is to take place as far as possible by simple means. Furthermore, the dwell time of the fluids in the assembly should often be as uniform as possible for reasons of reaction conditions and process engineering. Dead water zones and the local build-up of fluids should therefore as far as possible be avoided.

These complex inter-relationships are explained in more detail as an example of a washing machine drum and a partition for a filter.

The disadvantages arising as a result of high compression and acceleration forces are reflected, in the case of a washing machine drum, particularly in that the laundry is pressed into the holes of the drum wall during spinning. This gives rise to undesirable dents in the form of dimples in the spun laundry and, furthermore, to small fibre particles which pass through the holes into the tub and from there into the screen. This is undesirable particularly in the case of laundry consisting of fine textile. So as not to subject the laundry to excessive load, therefore, the washing lye is often not removed from the cleaned laundry during spinning to as great an extent as will be possible in technical terms. The residual moisture of the spun laundry, as a rule, is then subsequently removed at a later stage by means of energy-intensive drying.

DE 10 2005 026 175 A1 discloses a drum for laundry treatment machines, which is equipped with elliptic indentations which point in the direction of the interior of the drum. Since a plane wall surface or a cylindrical surface area cannot be filled completely in geometric terms with the aid of an elliptic or circular configuration of these indentations, there always remains a region of the originally non-structured plane wall or of the cylindrical surface area which is not covered by the elliptic or circular indentations. The holes for the lye outlet, called flood holes below, are arranged in this non-structured region of the drum which is furthest away from the drum axis in the radial direction. This gives rise in the region of the flood holes, with the spinning rotational speed of the drum being the same, to the highest centrifugal force for removing the lye from the washing drum. What is unsatisfactory in this case is that the flow of the lye in this non-structured region of the drum wall, in which the flood holes are also arranged, does not experience any geometric inclination perpendicularly to the drum wall. There is therefore also no geometric gradient which assists an accelerated outflow of the lye towards the flood holes. A geometrically radial flow gradient exists solely in the wall regions of the indentations, but not in the region of the outer drum wall where the flood holes are also arranged.

DE 19954027 A1 discloses a device for producing a casing of a washing machine drum which is provided with a hexagonal honeycomb structure.

With the aid of this honeycomb-shaped surface, the washing liquid which flows along the drum wall is steered gently back and forth on the vaulted honeycomb structures. An advantageous swirling of the flow thus takes place. The honeycomb structures possess approximately the contour of the vault structures (EP 0693008), the troughs directed towards the interior of the drum being in each case framed by folds and therefore filling the surface area of the drum completely. The flood holes are in this case arranged at the star points of the hexagonal holes. This affords an improvement, as compared with DE 10 2005 026 175 A1, because the flood holes from DE 19954027 A1 are not arranged on a smooth unitary cylindrical surface, but only on a narrow, for example linear surface of the folds. As a result, in the drum from DE 19954027 A1, the outflow of the lye during spinning is improved, as compared with the drum from DE 10 2005 026 175 A1. However, this geometric arrangement of the folds and of the flood holes in DE 19954027 A1 is not yet satisfactory, because, for the lye liquid to be removed during spinning, no radial gradient for the flow from the folds towards the flood holes exists in the region of the folds. Since the washing lye cannot yet be separated as efficiently as possible from the laundry in this way, the residual moisture of the laundry is removed, as a rule, by means of energy-intensive thermal drying in the laundry dryer.

In the case of a partition for filter discs, filter plates or filter drums and for centrifuging to remove solid particles from liquid media, such as water or oil, or from gaseous media, such as smoke gases, air-conditioned air, contaminated industrial gases or compressed air, for example, a screen wall has to absorb the compression forces required during filtration. The partition for a filter often consists of a filter support and of the filter means, in particular a close-mesh net, mixed fibres, synthetic fibres, glass fibres or foam materials. The filter support has the task of receiving usually soft and fine filter means and of absorbing the compression forces. These compression forces arise particularly due to the fact that the fluid to be separated from the solid particles has to be pressed through the filter means and the filter cake which is formed on the latter. These compression forces require a dimensional stability of the screen wall or of the filter support which is assisted by a small number of holes in the screen wall or filter support. The problem, then, is that, in the region of the non-holed screen wall, the fluid to be separated may build up and therefore has to be conducted along an extended flow path to the hole in the screen wall or filter support. This, in turn, requires an increased pressure for separating the solid particles from the fluid.

WO 98/40910 and US 2005/0252182 A1 describe ribbed or corrugated filter means in which, although they have a stiffening action, the stiffening is effective only in the direction of the profiling. The ribbed or corrugated filter means remains flexurally soft perpendicularly to the profiling. This has an adverse effect on the rigidity of, for example, filter discs or filter plates and also on cylindrical or conical wound modules which possess their profilings, in particular corrugations or ribs, in the axial direction of the module. WO 2005/08 24 84 A1 describes a filter element which contains a coarse-mesh cylinder as a filter support and a fan-shaped filter means. In order to save costs, it will be desirable to stiffen the filter means such that it at the same time also assumes the function of a filter support. There would therefore be no need for a filter support.

There are already in existence fine-mesh metal or plastic fabrics with screen widths into the μm range which are suitable as filter means for coarse particles of about 40 μm and for smaller particles of about a few μm, but often do not have a sufficient dimensional stability for absorbing the compression forces (without an additional filter support). Wound modules therefore often require a complicated set-up consisting of a filter means and filter support (M. Zogg: Einführung in die mechanische Verfahrenstechnik [Introduction to mechanical process engineering]; ISBN: 3-51906319-0; section 4.1.2: Querstromfiltration [Cross-flow filtration], pages 123-128).

To clean the filter units without the required demounting or exchange of the filter means, in particular, cleaning by means of pressure pulses is, of course, carried out, for example of a tubular filter (M. Stieß: Mechanische Verfahrenstechnik 2 [Mechanical processing engineering 2]; Springer Verlag, 1997; section 7.3.2.3: Bauarten von Abreinigungsfiltern [Types of cleaning filters], page 27). In this case, a pressure pulse is generated opposite to the normal flow direction, in order to throw off the accumulated filter cake. The disadvantage of this is that an additional supporting cage is often necessary for receiving the filter means, for example a tubular filter. It will be desirable, furthermore, to have an improved hydrodynamic rinsing-free effect in which the accumulation of solid particles on the filter means is reduced even during the operation of the filter. The time interval for the use of a filter means (batch operation) until exchange or cleaning could thereby be prolonged. All this should be capable of being implemented at as low an outlay as possible in terms of apparatus.

SUMMARY OF THE INVENTION

One object of the invention is to create a structured material web and a method for producing a structured material web having a high rigidity in which it is possible to attain an improved separation of a fluid from solids for various uses.

Another object of the invention is to create structured walls, through which a fluid medium can flow, in particular for the drum of a laundry treatment machine or for a screen wall, a filter support or a filter means or for a distribution or metering unit, in such a way that it not only possesses high rigidity, along with a low use of material, but, in particular, despite a small number of holes, an improved separation of fluid from the solids takes place, and also, at the same time, care of this solid product, for example of laundry, is ensured.

An object of the invention is, furthermore, to prolong the time interval, for example in batch operation of the filter element, by means of hydrodynamic and/or mechanical cleaning measures. Finally, the object is to improve the distribution or metering of fluid media in such a way that, in particular, the dwell time of the fluid media in the apparatus is as uniform as possible. All these improvements are to be capable of being implemented at a low outlay in structural terms.

This object is achieved, according to the invention, by means of a structured material web according to the independent claim 1 and a method for producing a structured material web according to the independent claim 27. Advantageous refinements of the invention are the subject-matter of independent subclaims.

According to one aspect of the invention, provision is made of a structured material web, in particular metal web, with a multi-dimensional structuring which has beads or folds and also structures arranged one adjacent to the other and in each case formed in a surface portion which is enclosed by the beads or the folds, each of the structures having a distinguished location with a hole and each of the surface portions being formed in every other location of the structure with an inclination towards the distinguished location.

In one embodiment, the material web, in particular sheet-metal material web or netting material web, is equipped with multi-dimensional structures in such a way that a high stiffening of the wall generated is obtained and, at the same time, a flow gradient inclined to the wall occurs for a fluid medium at all the locations of the material web. In addition, according to the invention, with the aid of multidimensional structures an improved cleaning effect for removing the accreted solid particles from the structured filter means or from the structured screen wall is achieved. This is attained either by means of a hydrodynamic rinsing-free effect or by means of a mechanical back-and-forth oscillation of the multi-dimensional wall structures. Finally, according to the invention, what is also achieved with the aid of multidimensional structures is that fluid media can be apportioned and metered in a defined and uniform manner, the dwell time being virtually uniform at all the locations of the structured material web owing to the inclined flow gradient.

According to a further aspect of the invention, a method for producing a structured material web from a web material is provided, in which the web material is produced with a multi-dimensional structuring which has beads or folds and also structures arranged one adjacent to the other and in each case formed in a surface portion which is enclosed by the beads or the folds, a hole being produced in a distinguished location in each of the structures, and the surface portion being formed in every other location of the structure with an inclination towards the distinguished location, and a flow direction of a fluid in the distinguished location always running with an inclination or perpendicular with respect to a mean material web plane.

In a method for producing a structured material web according to one refinement, in particular a sheet-metal material web or netting material web, the material web is equipped with multi-dimensional structures and holes in such a way that a high stiffening of the material web is generated and, at the same time, a geometric inclination of the structured wall surface with respect to its originally planar, that is to say not yet structured, wall surface is always formed in all the regions of the structured material web.

For separating a fluid from solid particles, a multi-dimensionally structured material web is used, which always has in all the regions a flow gradient for the fluid towards the flood holes in the wall. This is achieved in that the structured material web always possesses, in each of its structures, only one lowest point at which a flood hole is arranged. This may be achieved, in particular, preferably in that a three-dimensionally facet-shaped or a three-dimensionally wave-shaped or a vault-structured material web is used, a flood hole being arranged in each case at the lowest locations of its multi-dimensional structure.

The "three-dimensionally facet-shaped structure" or "three-dimensionally wave-shaped structure" or "vault-structured" material webs are, in particular, bands or sheets consisting of metal or of plastic or fibre composite materials, which are provided with a multi-dimensionally stiffening structure having structure sizes of a few millimeters or centimeters. In the various embodiments they are an isometric shape having no or only an insignificant increase in surface area of the structured material web.

These multi-dimensional structures are preferably obtained in a particularly material-caring way with the aid of a bulging method, a thin-walled material web of curved configuration being supported on its inside by, in particular, linear elements and being acted upon from outside with pressure. In this case, quadrangular or hexagonal bulge or vault structures arranged regularly according to the "plop" effect (EP 0693 008, EP 0900 131) or honeycomb-shaped bulge or vault structures (EP 0888 208) or three-dimensionally wave-shaped structures (DE 10 2005 041 516) or three-dimensionally facet-shaped structures (DE 10 2000 41 555) are established on the basis of controlled self-organization or in a technically modified way at a very low outlay in energy terms. These bulge structures formed on the basis of controlled self-organization may be assigned to what are known as "dissipative structures" (cf. I. Prigogine et al.: "Dialog mit der Natur" ["Dialogue with nature"], Pieper Verlag; F. Mirtsch at al.: "Corrugated Sheet Metal on the Basis of Self Organization", First International Industrial Conference Bionic 2004, Hanover Fair, Germany, in: Fortschritt—Berichte VDI Reihe 15, p. 299-313). The material webs structured in this way can then be transferred from their curved shape into the plane configuration (DE 198 56 236).

Whereas the folds in the bulge or vault structure have narrow radii, the beads of the three-dimensionally wave-shaped structures are equipped with markedly larger radii. This can be explained as follows: the bulge or vault structures occur when an instability point of the curved material web is overcome due to a puncture effect, with the result that narrow folds are established on account of the kinetic puncture energy in a similar way to the spontaneous buckling of thin walls. In the case of the three-dimensionally wave-shaped structuring, a puncture effect likewise occurs when an instability point is overcome, but the kinetic puncture energy is already for the most part damped during the structuring process by means of an elastic intermediate layer. Since the beads occurring in this case are equipped with a larger radius of curvature than that of the folds, this results, together with the enclosed spherical caps, virtually in a kind of multi-dimensional wave configuration, although a half-wavelength of the beads is smaller than a half-wavelength of the spherical caps enclosed by the beads. The name "three-dimensional wave-shaped structure" was therefore also chosen. In the method for producing these three-dimensionally wave-shaped structures, these smoothly rounded beads are formed with the aid of an additional elastic material layer which is guided between the material web to be structured and the supporting elements. The surface portions of the material web which are enclosed by these beads form spherical caps which at least approximately form the segment of a spherical surface. In contrast to this, in the bulge or vault structures, troughs enclosed by folds are obtained, which, as a rule, do not have such approximately spherically rounded spherical caps. On account of the smoother roundings of the beads, the material of the material web is subjected to only very little stress during structuring (DE 10 2005 041 516).

The three-dimensionally facet-shaped structures are obtained with the aid of a secondary structuring process, in that in each case a preferably hexagonal trough or spherical cap of a bulge-structured or vault-structured or three-dimensionally wave-shaped structured material web is pressed on its concave side against preferably three supporting elements which converge to a star point. In this case, these supporting elements converging to a star point are not arranged in one plane, but three-dimensionally to a virtually pyramidally converging tip, such that they support the trough or spherical cap of the bulge structure or vault structure or three-dimensionally wave-shaped structure on the concave side of the structure. When the trough or spherical cap of the material web is then acted upon with pressure from outside, that is to say from its convex side, the trough or spherical cap is pressed in between the supporting elements. This gives rise to the three-dimensionally facet-shaped structures (DE 10 200041 555) with their three-dimensionally arranged plane or only slightly curved facet surfaces which are enclosed by folds. The plane facet surfaces are established preferably in the case of material webs consisting of high-strength materials which possess a high yield strength, for example the aluminium alloy "Titanal" of the company Amac (yield strength approximately 580 $N/mm^2$; tensile strength approximately 640 $N/mm^2$). The facet surfaces may also be enclosed by beads, in that, both during the primary structuring process (three-dimensionally wave-shaped structuring) and during the secondary structuring process, in each case an elastic material web is additionally guided between the material web to be structured and the supporting elements.

The configuration of the facet surfaces formed is determined, in particular, by the choice of positioning of the pyramid tip in the primarily structured, preferably hexagonal material web. If, in the material web, the pyramid tip, generated by means of three supporting elements converging symmetrically and in a star-shaped manner to a star point, is arranged in the middle of the hexagon such that the folds of the pyramids issue in each case into a corner point of the hexagon, three congruent facet surfaces which are arranged three-dimensionally are formed for reasons of symmetry. According to the invention, the pyramid tip may be designed so as to be elevated, as compared with the corner points of the hexagon, in two ways: case a: if the pyramid tip is arranged outside the centre of the hexagon, non-congruent facet surfaces are formed, as a rule. If the pyramid tip is displaced from the centre of the hexagon in the direction of a corner point of a hexagon, at the same time only a single fold of the pyramid coinciding with a single corner point of the hexagon, this gives rise in each case to two congruent three-dimensionally arranged parallelograms as facet surfaces and, furthermore, to a hexagonal facet surface which is formed, in particular, by four equal folds and two further equal folds, the first being longer than the second. As a result, the pyramid tips emerge, elevated somewhat, geometrically. Case b: the elevation of the pyramid tip may also take place in that the supporting elements already converge to a star point in such a way that the pyramid tip thus formed acquires an increased height.

According to the invention, a material web through which a fluid medium is to flow is provided with structures lined up multi-dimensionally with one another, a structure consisting of a surface portion which is enclosed by folds or beads, and a distinguished location with a hole in the material web being present in each structure, so that an inclination towards the distinguished location always occurs from every other location of this structure. This gives rise, for a medium flowing from any location of the material web, to a preferably continuous gradient towards the distinguished location of the material web having the flood hole.

According to one embodiment of the invention, a three-dimensionally facet-shaped structured material web with preferably in each case one hole in each case one pyramid tip which is formed by preferably three three-dimensionally arranged facet surfaces is arranged.

According to a further embodiment of the invention, a bulge-structured or vault-structured or three-dimensionally wave-shaped structured material web is used such that a flood hole is formed in each case at the lowest point of the trough or spherical cap of each individual structure. Thus, for example, during the separation process the fluid flows on the inside of the trough or spherical cap of each individual structure and flows through the flood hole at the lowest point of the trough or spherical cap.

According to a refinement of the invention, the three-dimensionally facet-shaped structured material web with the flood holes in the pyramid tips and the three-dimensionally wave-shaped structured or vault-structured material web with the flood holes in the troughs or spherical caps are used, the pyramid tips or the lowest points of the troughs or spherical caps being arranged in each case on the outer circumference of the washing drum. This ensures that the flow of the washing lye during spinning always requires a component acting in the radial drum direction and, at the same time, the maximum centrifugal force is active at the flood hole. An improved degree of drainage of the laundry consequently takes place, without the spinning rotational speed or the number of flood holes having to be increased. As a result, more care of the laundry can be taken and the rigidity of the washing drum can be increased, with the wall thickness of the drum remaining the same.

According to a further refinement of the invention, the three-dimensionally facet-shaped structured material web with the holes in the pyramid tips and the three-dimensionally wave-shaped structured or vault-structured material web with the holes in the troughs or spherical caps is used as a screen wall, screen drum or filter support. As a result, in particular, the separation of the fluid from the solid can be improved, because a vertical or inclined flow with respect to the plane of the not yet structured wall exists at each location of the structured material web. The material web may have a plane configuration; it may, however, also be curved, preferably as a cylindrical or conical drum, through which the fluid flows from its inside or from its outside.

According to a further refinement of the invention, as an initial material, an already preferably uniformly holed material web is equipped with three-dimensionally facet-shaped or three-dimensionally wave-shaped structures or with bulge or vault structures, and this is used, in particular, as a screen wall, screen drum or filter support. With an increasing number of holes in the material web, although the permeability for the fluid media is increased, the rigidity of the material web is nevertheless reduced. This loss of rigidity as a result of the holing in a non-structured (plane) material web can be at least compensated, according to the invention, by means of the stiffening action of the three-dimensionally facet-shaped or three-dimensionally wave-shaped structures or the bulge or vault structures.

According to the invention, a filter means is equipped with three-dimensionally facet-shaped or three-dimensionally wave-shaped structured or bulge-structured or vault-structured structures so that it becomes dimensionally stable such that a filter support is not required. The filter means used may be, in particular, close-mesh nettings consisting preferably of metal, mixed fibres or synthetic fibres and glass fibres which are stabilized, for example, by means of resins. These multi-dimensionally structured filter means may be used, for example, in filter plates, filter screens or filter drums.

According to a further refinement of the invention, a layered module or a wound module is formed from three-dimensionally facet-shaped structured or three-dimensionally wave-shaped structured or bulge-structured or vault-structured filter means, in which layered module or wound module a multi-dimensionally structured material web, as filter means, is, for example, either layered to form a plane plate stack or wound to form a cylindrical or conical module. The advantage is, in particular, that additional spacer elements which space and at the same time stabilize the individual plies of the filter means may be dispensed with.

In a further refinement of the invention, a three-dimensionally facet-shaped or three-dimensionally wave-shaped or bulge-structured or vault-structured filter means, onto which a filter cake can normally accrete in time during the operation of the filter, is employed, which can be cleaned, without having to be demounted. This may take place according to three different methods:

1. By means of a pneumatic or hydraulic pressure pulse against the convex side of the trough or spherical cap or against the outside of the pyramidal protuberances of the structure of the filter means, these troughs or spherical caps of these pyramidal protuberances can be deformed and at the same time at least somewhat flattened. They may even, under an increased pressure pulse, be deformed to an extent such that a dynamic puncture of the trough or spherical cap takes place and the adhering filter cake is thereby virtually thrown away. After the pressure pulse has ended, the punctured troughs or spherical caps or the pyramidal protuberances can spring back again at least approximately into their original configuration in the case of a preferably elastic material behaviour of the structured filter means, so that this cleaning process takes place, for example, reversibly. In this case, the beads (with smooth radii) of the three-dimensionally wave-shaped or three-dimensionally facet-shaped structures may behave more advantageously than the folds of the vault structures (with their narrow radii of the folds). This results in a higher fatigue strength (stress-number curve) under dynamic or oscillating load on the structured filter means during cleaning operation.

2. The removal of the filter cake on the structured filter means may also take place as a result of a deformation of the structured filter means in its membrane direction. This may occur both due to static tensile or compressive load and due to an oscillating tensile or compressive load. In this case, the three-dimensionally facet-shaped structured or three-dimensionally wave-shaped structured or bulge-structured or vault-structured filter means has a compensating behaviour in such a way that the individual structure folds or structure beads and the troughs or spherical caps can be moved back and forth somewhat virtually in the same way as a concertina without in this case losing their structure. As a result, they differ fundamentally from a plane material web which, under tension, tears easily and, under compression, becomes slightly unstable, buckles and may fail. An advantageous application is, for example, a cylindrical or conical filter cartridge which is deformed axially in a static or oscillating manner. In this way, in particular, the exchange intervals of the filter cartridge during operation can be prolonged.

3. Reduced adhesion of the solid particles to the filter means or the filter support or to the screen wall may also be achieved, according to the invention, in that, during the flow over the three-dimensionally facet-shaped structured or three-dimensionally wave-shaped structured or bulge-structured or vault-structured material web, a rinsing-free effect is established. This has been shown by experimental thermohydraulic investigations on vault-structured walls, during the flow around the structures the flow boundary layer first breaking away locally from the wall and then coming to lie against the wall again. This gives rise to local turbulence zones (F. Mirtsch, W. Roetzel: "Measurement Local Heat Transfer Coefficients on Profiled Walls of Heat Exchangers", ICHMT International Symposium on New Developments in Heat Exchangers, Lisbon, Portugal 6-9, 1993). According to the invention, such turbulence zones can bring about the rinsing-free effect for a reduced accretion of solid particles on a multi-dimensionally structured wall. In this case, the beads with their smooth roundings may behave even more advantageously than the folds with their narrow radii, because dead water zones, as they are known, in the region of the narrow folds are avoided or at least reduced.

In a further embodiment of the invention, a three-dimensionally facet-shaped or three-dimensionally wave-shaped structured or a bulge-structured or vault-structured material web, at whose pyramid tip or lowest locations of the spherical caps or troughs a hole is arranged, may be used preferably for a uniform distribution of fluid media or for a metering of fluid quantities. The uniform distribution of fluid media takes place, for example, in a container, the horizontal bottom of which has three-dimensionally facet-shaped or three-dimensionally wave-shaped structures or bulge or vault structures and holes of equal size arranged at the lowest locations of the structured bottom. This gives rise in each case in all the structures to an identical flow gradient and therefore identical throughflow quantities through the individual holes.

Furthermore, with the aid of this structured bottom provided with holes, a uniform metering of the quantities of fluid media can be implemented, for example, as follows: first, the holes are closed, for example, from below (on the convex side). The structured bottom is then filled up from above to an extent such that the structures are filled full exactly to the edge, the liquid level being as exactly as possible flush with the top edge of the folds or beads. This may take place in that the excess fluid quantity which first rises above the top edge of the folds or troughs is removed preferably with the aid of a wiper in the form of a rubber lip. After the opening of the holes, the fluid quantity can flow out through the holes.

In order to prevent small quantities, particularly in the form of droplets, from adhering to the structured bottom when the fluid medium flows out, the material web is preferably provided with an anti-stick coating. Where aqueous media are concerned, this may be achieved, for example, by means of a Teflon coating. According to the invention, however, a surface given the lotus effect may also be used, as experimental investigations have shown.

The essential advantage of the three-dimensionally wave-shaped structures or of the bulge or vault structures is in this case that these are generated, without the surface of the concave side of the troughs or spherical caps being touched, during structuring, by a rigid die and therefore excluding the possibility of the surface being damaged at all. In the three-dimensionally facet-shaped structuring, the plane or only slightly curved facet-shaped surfaces cannot be damaged, because in this case there are likewise no sheet-like dies. Only in the region of the folds which converge to the pyramid tip may the surface of the material web be impaired somewhat by linear rigid supporting elements. However, if the facet structures are equipped with beads instead of with folds, the surface does not come into contact at any point with a rigid supporting element or rigid die. Consequently, according to the invention, material webs with anti-stick coatings or anti-stick surfaces, ranging up to surfaces with the self-cleaning lotus effect, may be used, in which the material web may be equipped with these surface properties before or after the multi-dimensional structuring. A further advantage is that possible damage to this surface having the fluid-repelling effect occurs in the usual operating situation, if at all, solely in the region of the upper edges of the folds or beads, for example when a wiper is led along the upper edges.

In a development of the invention, there is provision for the beads or folds to be formed according to one or a combination of a plurality of geometric basic forms from the following group of geometric basic forms: triangle, quadrangle, in particular square, rectangle, lozenge or parallelogram, pentagon, hexagon and octagon.

In a preferred development of the invention, the structuring is a self-organizing structuring. In this case, the troughs or spherical caps and the folds or beads are obtained in a particularly material-caring way.

The configuration of the multi-dimensional structures may take place, according to the invention, preferably also with the aid of geometrically adapted supporting elements, for example on a roller or roll, during continuous operation, with the aid of geometrically adapted dies, such as a male mould and female mould or a male mould and active medium, in particular elastomer or fluidic medium.

In an expedient embodiment of the invention, there is provision for the structured material web to be a workable substance or a combination of workable substances selected from the following group of workable substances or materials: metals of all types up to high-strength steel alloys or aluminium alloys, such as "Titanal", plastic, fibrous substances, in particular paper and cardboard, fibrous tissue and knitted fabric.

In an embodiment of the invention for producing a stiffened material web for the throughflow of fluid media, there is provision for a material web, for example a sheet metal web, to receive first, at all locations where the pyramid tips of the three-dimensionally facet-shaped structured material web are subsequently introduced, a hole, preferably by means of punching tools or with the aid of a laser. The material web provided with holes is then pressed preferably with the aid of an elastic pressure roller against a supporting-element roller and is thereby bulge-structured or vault-structured. Alternatively, in addition, an elastic intermediate layer is led between the material web to be structured and the supporting-element roller, so that three-dimensionally wave-shaped structures which contain beads are formed. In this case, preferably, the supporting elements are arranged on a supporting-element roller in such a way that the multi-dimensional structures occur on the basis of self-organization. However, the supporting elements may also possess a configuration deviating somewhat from this. Subsequently, the bulge-structured or vault-structured or three-dimensionally wave-shaped structured material web equipped with holes (hereafter: primarily structured and holed material web) is shaped in a secondary structuring method, as follows, into a three-dimensionally facet-shaped structured material web provided with holes.

The primarily structured and holed material web is pressed, on the side where the concave troughs or spherical caps are located, against a further supporting-element roller, in that, preferably, a further elastic pressure roller presses onto the opposite side of the material web where the convex troughs or folds are located. Thus, in each case a pyramid tip, which is preferably composed of three facet surfaces, is formed in the trough or spherical cap of the structures where the hole is also located in each case.

In a further embodiment of the invention for producing a stiffened material web, in particular for a washing machine drum, the material web provided with holes and with three-dimensionally facet-shaped structures is bent into a drum in such a way that the pyramid tips are oriented radially to the outside of the drum. In the case of the three-dimensionally facet-shaped structures, this orientation of the pyramid tips may take place preferably in that, during the secondary structuring process, the pressure force of the secondary supporting-element roller is selected so high that the three-dimensionally facet-shaped structured material web is pressed into the secondary elastic pressure roller and thereby acquires a curvature which preferably corresponds to the curvature of the drum. However, it is also possible in this way to produce a curvature of the three-dimensionally facet-shaped structured material web which does not yet completely reach the curvature of the material web. In this case, the three-dimensionally facet-shaped structured material web can subsequently be shaped into the desired curvature of the drum, for example, by means of edge rolling.

In a further embodiment of the invention for producing a stiffened material web, in particular for a washing machine drum, the material web provided with holes and with three-dimensionally wave-shaped structures is bent into a drum in such a way that the lowest locations of the spherical caps are oriented radially to the outside of the drum. This takes place as follows: after the three-dimensionally wave-shaped structuring of a material web, the lowest locations of the spherical caps are arranged on the inside of the curved material web. By means of subsequent edge rolling, the three-dimensionally wave-shaped structured material web can be converted into a countercurvature, so that the lowest locations of the spherical caps are brought onto the outside of the three-dimensionally wave-shaped structured material web. This possibility of "counterbending" is a special feature. This is because earlier experimental investigations in the "counterbending" of a bulge-structured or vault-structured material web (what is meant is an excessive straightening, virtually "counterbending", out of the original curvature of the vault structuring into the plane configuration and then into the countercurvature) had shown that the folds of the bulge or vault structures become unstable and buckle slightly during the "counterbending". It was found, then, surprisingly, that in this case the beads of three-dimensionally wave-shaped structures behave better during "counterbending" than the folds of the bulge or vault structures, because they do not buckle so easily. The reason for this is that the material stresses occurring in the beads (large radius) during "counterbending" can be distributed more uniformly than in the folds (small radius).

According to a further aspect of the invention, even a "counterbending" of the bulge-structured or vault-structured material web may be possible only when the ratio of structure depth (depth of the trough) to material thickness is low. The structure depth is low particularly when the structure size, characterized in a hexagon by the width across flats of the hexagon of the structure, is also low.

For example, these relationships are explained by means of three experimental investigations: case a: when a material web consisting of ductile sheet steel of thickness 0.6 mm is provided with a hexagonal bulge or vault structure of width across flats of 50 mm and structured depth of about 4 mm, the folds of the bulge or vault structures begin to buckle beyond a "countercurvature" corresponding to the radius of about 200 mm. In contrast to this, with the same material, same thickness, same structure depth and same width across flats, the three-dimensionally wave-shaped structured material web begins to buckle only under a higher "countercurvature" corresponding to the radius of about 150 mm. Case b: when a material web consisting of sheet aluminium and of conventional reflector material of the lighting industry, of thickness 0.4 mm, is provided with a hexagonal bulge or vault structure of width across flats of 16 mm and a structure depth of about 0.5 mm, the structured material web begins to buckle only beyond a "countercurvature" corresponding to the radius of about 30 mm.

Such methods for producing a multi-dimensionally structured material web are preferably carried out, according to the invention, on the basis of self-organization, particular care being taken of the workable substance of the material web. According to the invention, there may also be a deviation from the configuration of the supporting elements which is found from self-organization, in that the configuration of the supporting elements is not found and used by self-organization.

If the workable substance of the material web has sufficient plasticization reserves, then, according to a method of the invention for producing a multi-dimensionally structured material web for the throughflow of fluid media, the material web may be provided with the aid of a mechanical forming roller or forming female mould and an elastic or fluidic active medium or, alternatively, with the aid of a forming male mould and a female mould with multi-dimensional structures which make it possible for a fluid to flow always at an inclination or perpendicularly to the structured wall.

In a further embodiment for producing a multi-dimensionally structured material web, in particular for filter means, a material web consisting of netting, preferably of high-grade steel, is provided in a corresponding production method with three-dimensionally facet-shaped or three-dimensionally wave-shaped or bulge-structured or vault-structured structures, although the holing operation may be dispensed with. In a further embodiment for producing a multi-dimensionally structured material web, in particular for filter means, a material web consisting of netting is provided with three-dimensionally facet-shaped or three-dimensionally wave-shaped or bulge-structured or vault-structured structures and is then bent into a body of revolution, for example in such a way that the troughs, spherical caps or pyramid tips point radially inwards. The body of revolution thereby acquires a high dimensional rigidity, particularly when a fluid flows through it from outside and it is thereby acted upon by pressure. The troughs, spherical caps or pyramid tips of the material web bent into a body of revolution may also be directed radially inwards.

DESCRIPTION OF PREFERRED EXEMPLARY EMBODIMENTS OF THE INVENTION

The invention is explained in more detail below by means of exemplary embodiments, with reference to figures of a drawing in which.

BRIEF DESCRIPTION OF THE FIGURES

Figure 1:
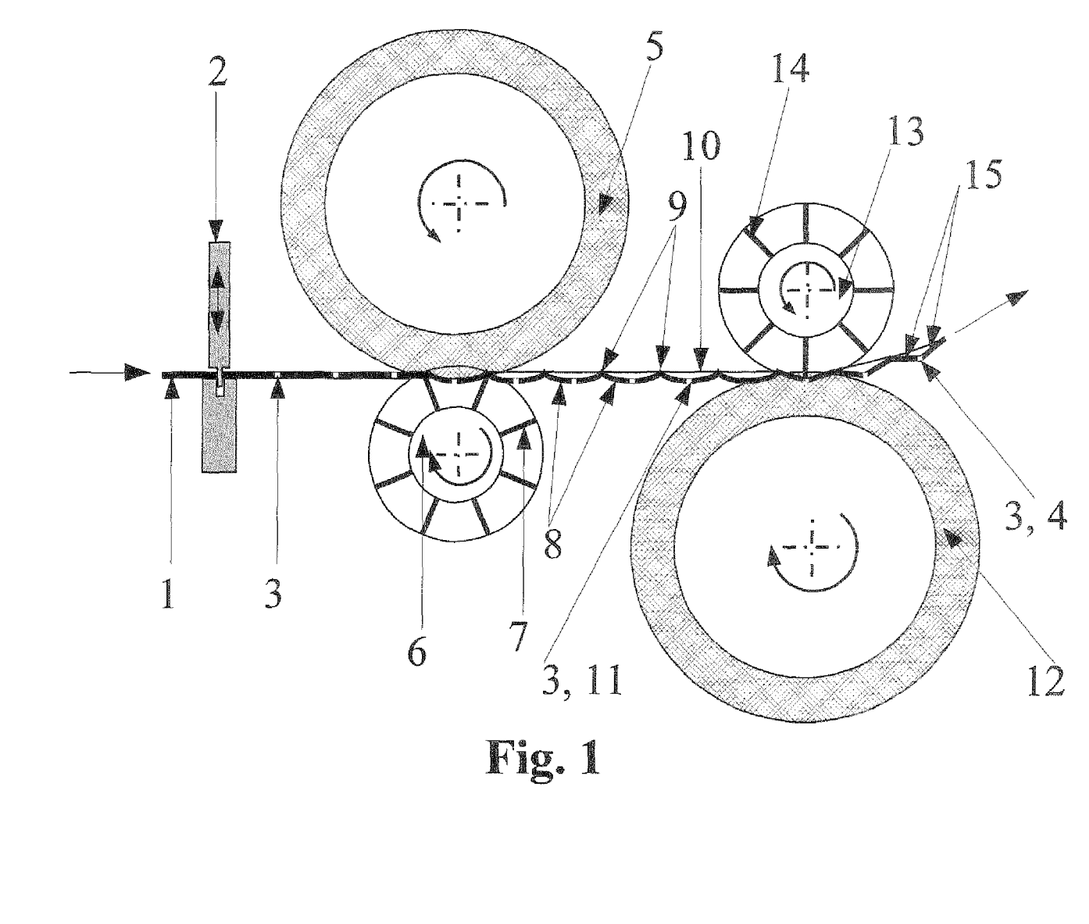
FIG. 1 shows diagrammatically a device for producing a three-dimensionally facet-shaped structured material web, at the pyramid tips of which a hole is arranged in each case.

FIG. 1 illustrates diagrammatically a device for producing a three-dimensionally facet-shaped structured material web 1, at the pyramid tips 4 of which a hole 3 is arranged in each case. A plane material web 1, in particular a sheet metal web, is first provided by means of a holing device 2, consisting, for example, of a mandrel and holing punch, with a hole 3 at the points at which the pyramid tips 4 are subsequently formed. With the aid of an elastic pressure roller 5, the material web 1 is then pressed against the supporting-element roller 6, on which hexagonal supporting elements 7 are arranged, so that hexagonal vault structures consisting of troughs 8 and folds 9 transversely to the running direction of the material web 1 and of folds 10 in the running direction of the material web 1 are obtained. In this view, the folds 10 of the hexagon can be seen merely as a visible edge.

The holes 3 are located at the lowest point of the troughs 11. Subsequently, the hexagonally structured material web is pressed with the aid of the elastic pressure roller 12 against the supporting-element roller 13, on which in each case three supporting elements 14 converge into a star point (explained in more detail in FIG. 2). In the view of FIG. 1, in each case only one supporting element 14 of the in each case three supporting elements overall can be seen. Thus, the three-dimensionally facet-shaped structures, in the pyramid tips 4 of which the holes 3 are located, are generated. In this view of FIG. 1, only two part-surfaces 15 of a facet-shaped structure in each case can be seen.

Alternatively, the three-dimensionally facet-shaped structures may also be formed from three-dimensionally wave-shaped structures, instead of from the vault structures (not illustrated explicitly in FIG. 1). In this case, in a similar way, the three-dimensionally wave-shaped structures are obtained in that, in addition, an elastic intermediate layer (not illustrated explicitly in FIG. 1) is led between the elastic pressure roller 5 and the material web 1 to be structured, with the result that hexagonally arranged beads 22 (instead of the folds 9 and 10) and spherical caps 21 (instead of the troughs 8) are formed. The beads 22 and spherical caps 21 are explained in more detail later in FIG. 5. On account of the additional elastic intermediate layer, the beads 22 possess a softer rounding (correspondingly large radius of curvature) than the folds 9 and 10 with their small radius of curvature. In this case, instead of the troughs 8, the spherical caps 21 are obtained which correspond more to the section of a sphere than the trough 8.

Figure 2:
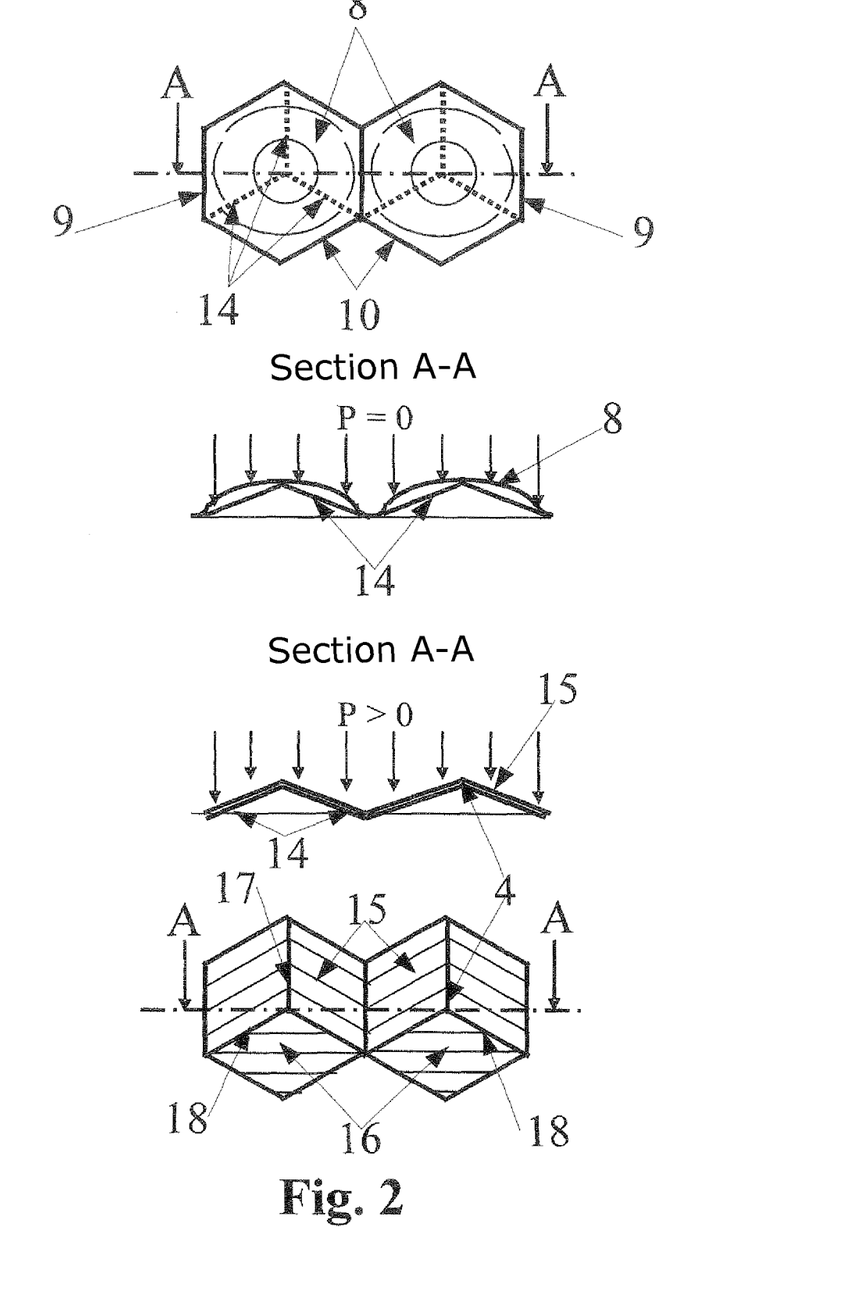
FIG. 2 shows diagrammatically the development of the configuration of a hexagonally vault-structured wall portion in the two upper images into a three-dimensionally facet-shaped structured wall portion in the two lower images.

It is explained in more detail diagrammatically in FIG. 2 how a three-dimensionally facet-shaped structured material web is obtained from the hexagonal vault structure. In the uppermost image, the troughs 8 and the folds 9 and 10 of the vault structure are illustrated, the troughs 8 being supported on their concave side in each case by three supporting elements 14 converging into a star point.

The upper sectional view A-A illustrates the arrangement of the supporting elements 14 (below the troughs 8) before the action of pressure (P=0). The lower sectional view A-A illustrates the arrangement of the supporting elements 14 (below the troughs 8) after the action of pressure (P>0), the supporting elements 14 and the formed surfaces 15 of the three-dimensionally facet-shaped structured material web touching one another. In this case, the vertical arrows indicate the direction of the pressure as a result of the elastic pressure roller 12 (in FIG. 1). This gives rise to the folds 17 and 18 of the facet-shaped structure. The lower image of FIG. 2 illustrates the finished three-dimensionally facet-shaped structured material web with its plane or only slightly curved facet surfaces 15 and 16. The facet surfaces 16 are located on a common plane, while the facet surfaces 15 are located on two different planes.

In FIG. 2, the star point, which is caused by the three converging supporting elements 14, forms the pyramid tip 4 of the three-dimensionally facet-shaped structure. This star point is arranged in FIG. 2 in the middle of the hexagonal structure. However, the star point may also lie in the middle or outside a triangular, quadrangular, such as rectangular, square, rhombic, parallelogram-shaped, pentagonal, hexagonal, octagonal or honeycomb-shaped structure, in that the supporting elements 14 are arranged accordingly. What is meant by honeycomb-shaped structures is that, instead of the straight supporting elements 7 or 14, curved supporting elements and curved folds resulting from these are formed. The geometry of the facet surfaces also changes correspondingly as a result. The formation of three-dimensionally facet-shaped structures may also take place in a similar way in that, instead of the hexagonal vault structures which consist of folds and troughs, three-dimensionally wave-shaped structures consisting of beads and spherical caps are used. These give rise to three-dimensionally facet-shaped structures with more smoothly formed contours. These are not illustrated explicitly in FIG. 2.

Figure 3:
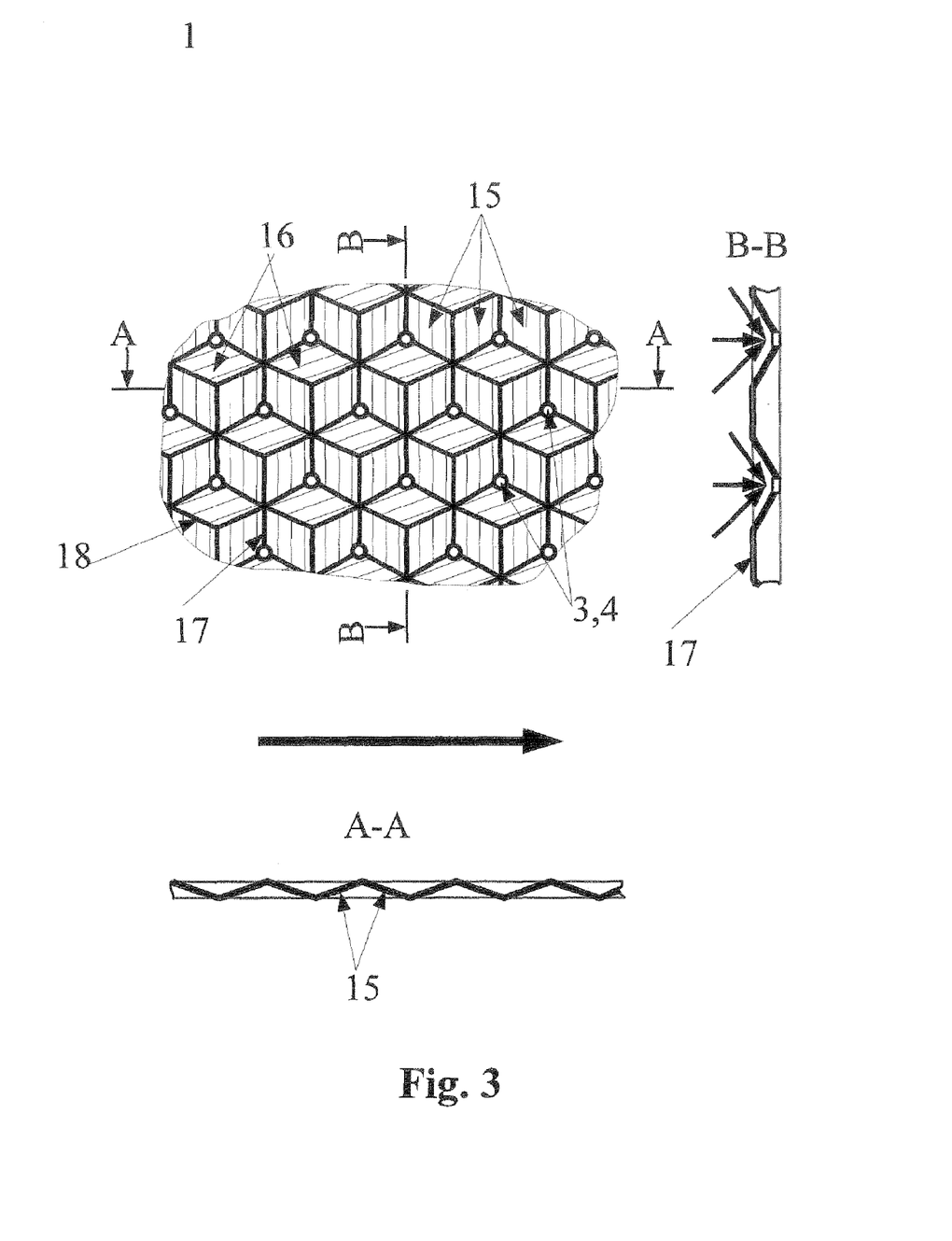
FIG. 3 shows diagrammatically a top view of a three-dimensionally facet-shaped structured material web with holes in the pyramid tips.

FIG. 3 illustrates diagrammatically a top view of a three-dimensionally facet-shaped structured material web with holes 3 which are located in the pyramid tips 4. The section A-A illustrates the facet surfaces 15 inclined three-dimensionally with respect to one another. The section B-B shows the arrangement of the folds 17 of the facet structure with the hole 3 arranged in the pyramid tip 4 in the manufacturing direction (see the large arrow). The small arrows in the section B-B indicate diagrammatically the direction of flow towards the pyramid tip. In each facet structure there is always a flow gradient towards the hole in the pyramid tip.

Figure 4:
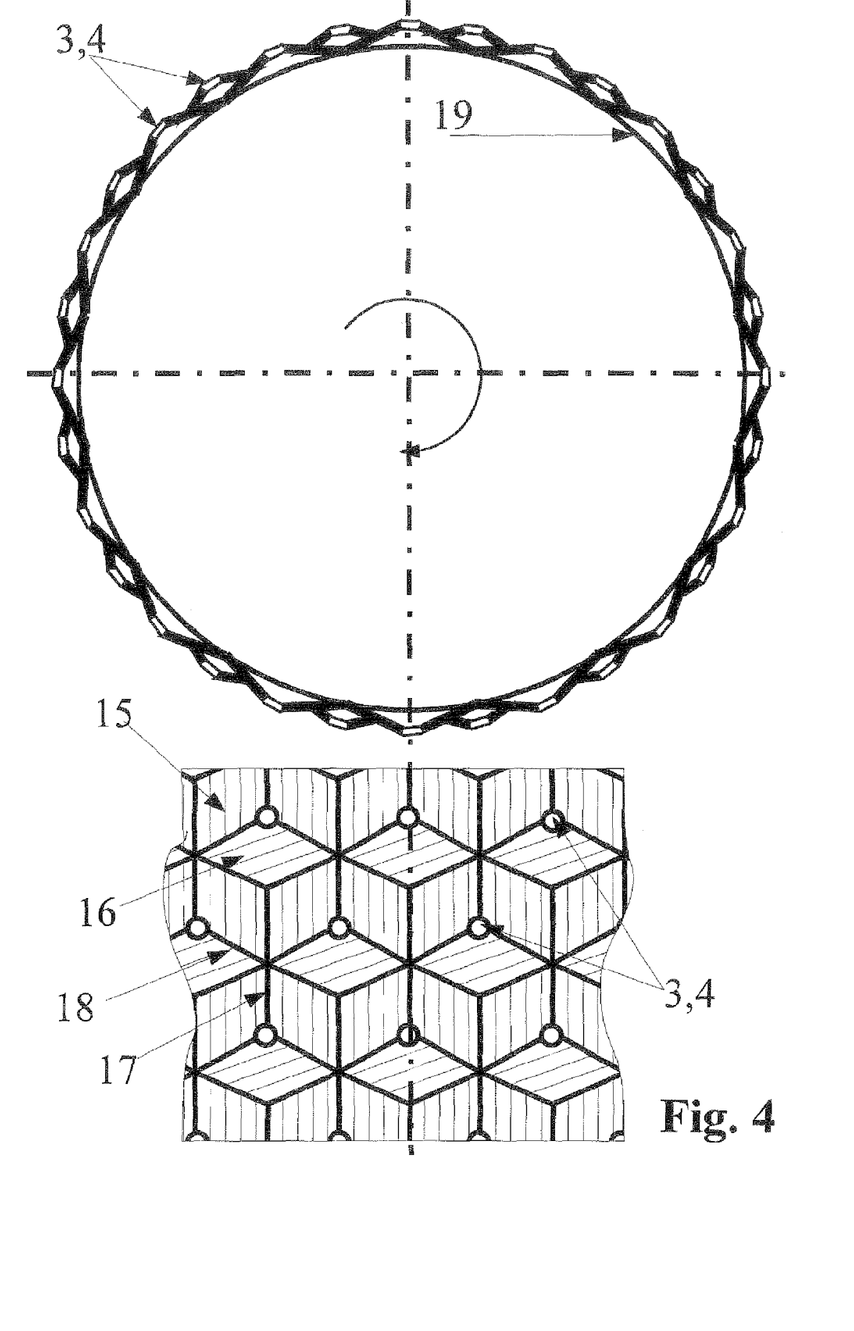
FIG. 4 shows diagrammatically an axial cross section through a three-dimensionally facet-shaped structured drum, in particular for a washing machine, with outward-pointing pyramid tips in which the flood holes are arranged, in the upper image, and a detail of a top view of the drum, in the lower image.

FIG. 4 illustrates diagrammatically in the upper image an axial cross section through a three-dimensionally facet-shaped structured drum 19, for example for a washing machine. The holes 3 are located in the pyramid tips 4 which are arranged on the outer radius of the drum wall. As a result, within the rotating drum 19, a fluid not only acquires at the location of the holes the highest centrifugal acceleration for a given drum rotational speed, but at the same time, at each location of the drum inner wall, always a flow component which is directed radially outwards. The degree of separation of the fluid from the solid is thereby improved. The lower image illustrates a top view of the three-dimensionally facet-shaped structured drum wall in a developed view.

Figure 5:
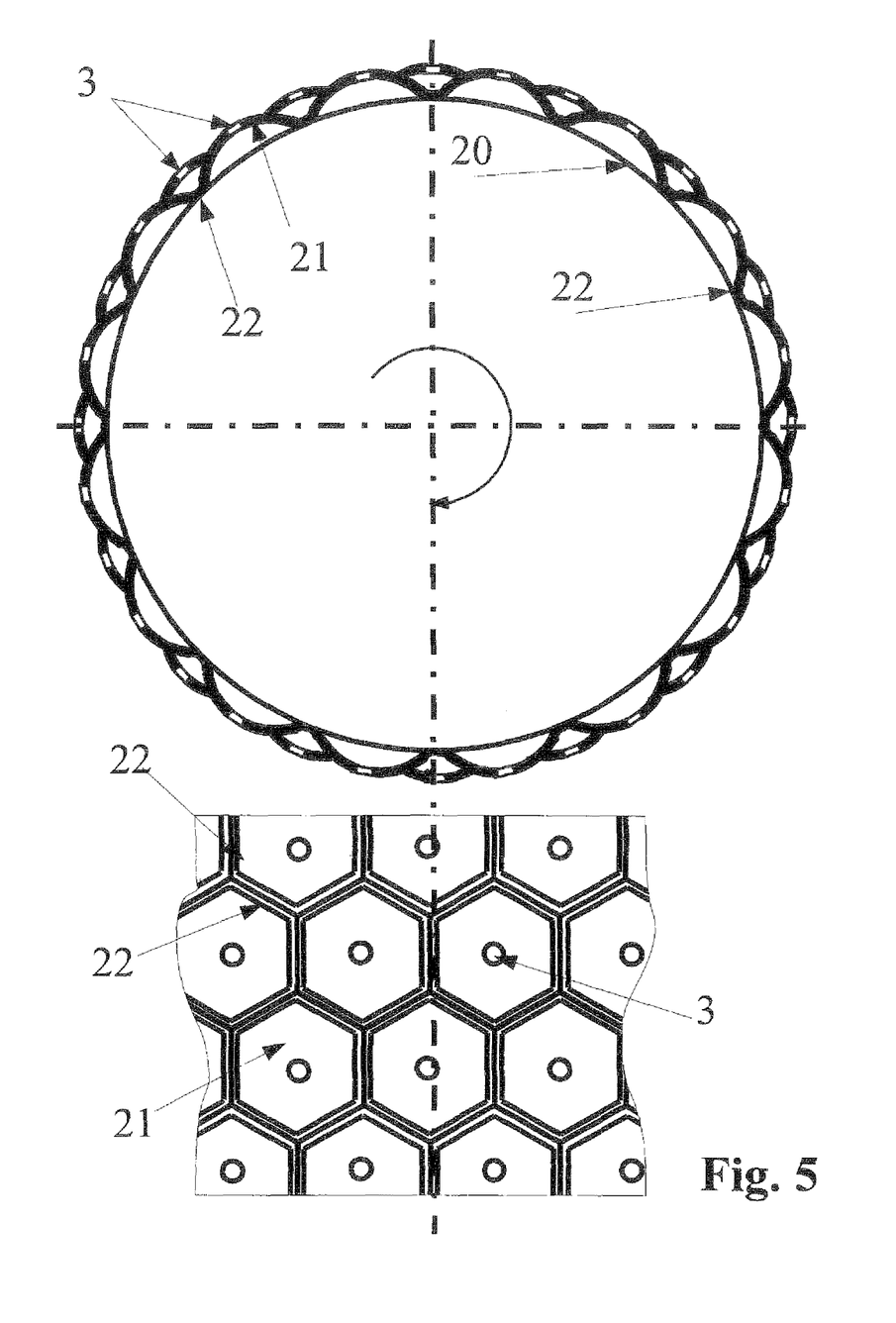
FIG. 5 shows diagrammatically an axial cross section through a vault-structured or three-dimensionally wave-shaped structured drum, in particular for a washing machine, with outward-pointing troughs or spherical caps, in the centre of which a flood hole is arranged in each case, in the upper image, and a detail of a top view of the drum, in the lower image.

FIG. 5 illustrates diagrammatically in the upper image an axial cross section through a three-dimensionally wave-shaped structured drum 20, for example for a washing machine. The holes 3 are located at the lowest location of the spherical caps 21 which are located on the outer radius of the drum wall. The beads 22 of the three-dimensionally wave-shaped structured drum have a soft rounding, in contrast to the folds of the bulge or vault structures, and can therefore also be bent more smoothly into the configuration of the drum 20, the spherical caps 21 pointing outwards and the beads 22 inwards. As a result, in the rotating drum 20, the fluid not only acquires at the location of the holes 3 the maximum centrifugal acceleration for the given drum rotational speed, but at the same time at each location of the drum inner wall, always a flow component which is directed radially outwards.

Figure 6:
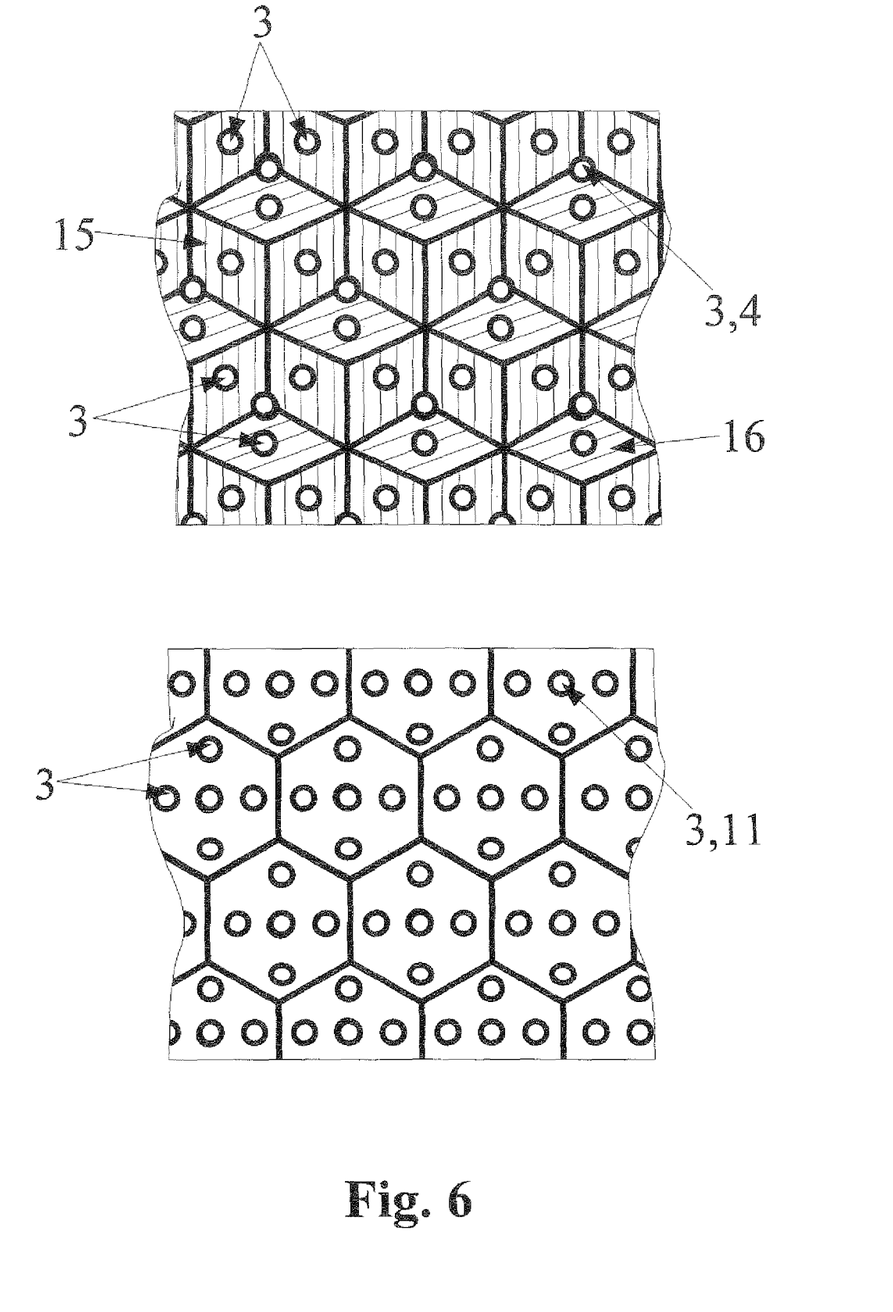
FIG. 6 shows diagrammatically a top view of a three-dimensionally facet-shaped structured wall portion, in each structure of which a plurality of holes are arranged, in the upper image, and a top view of a vault-structured or three-dimensionally wave-shaped structured wall portion, in each structure of which a plurality of holes are arranged, in the lower image.

FIG. 6 illustrates diagrammatically in the upper image a top view of the wall portion of a three-dimensionally facet-shaped structured material web in which not only are holes 3 arranged in the pyramid tips 4, but also holes 3 in the facet surfaces 15 and 16. The lower image illustrates diagrammatically a top view of the wall portion of a vault-structured material web, at the same time illustrating, in addition to the holes 3 at the lowest location of the trough 11, also holes 3 which are arranged at further locations of the trough. These hole arrangements are by way of example. Further holes 3 may also be formed at other locations of the facet surfaces and of the troughs. Similar arrangements of the holes 3 arise when beads 22 are used instead of the folds 17 and 18 of the three-dimensionally facet-shaped structures, or when beads 22 and spherical caps 21 are used in a similar way, instead of the folds 9 and 10 and the troughs 8 of the vault structures. These arrangements are not illustrated explicitly in FIG. 6.

Figure 7:
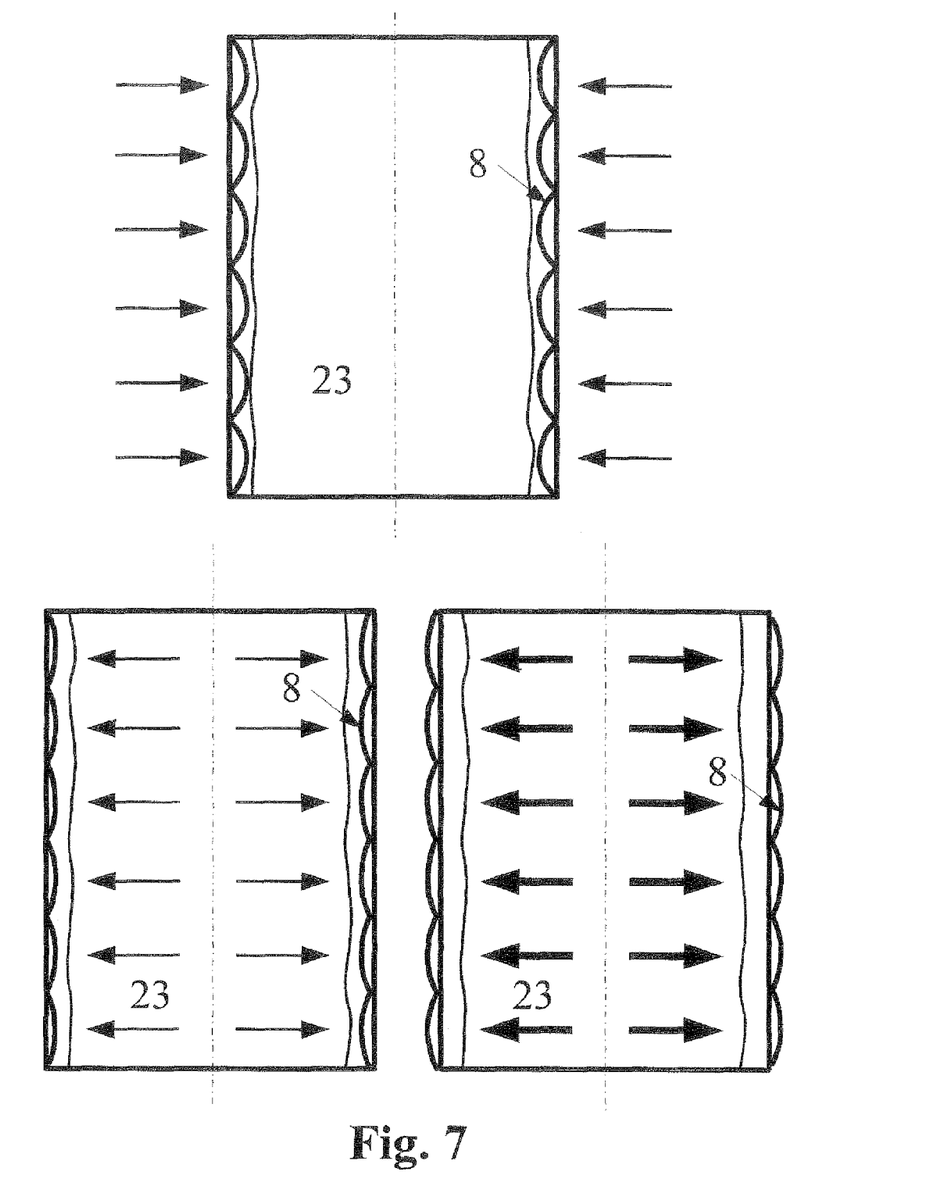
FIG. 7 shows diagrammatically a cross section through a vault-structured or three-dimensionally wave-shaped structured cylinder, in particular consisting of filter means, through which the flow passes radially from outside in the upper image and which is thereby acted upon by pressure, and, in the lower image on the left is acted upon with a low pressure radially from inside and, in the lower image on the right, is acted upon by an increased pressure radially from inside.

FIG. 7 illustrates diagrammatically in three images a cross section through a cylindrical vault-structured filter means 23. The arrows in these images illustrate the direction of flow of the fluid and therefore also the direction of the active pressure. The upper image illustrates the normal operating state of the filter means 23, the fluid medium to be filtered flowing from outside inwards through the filter means 23, consisting, for example, of mesh-like high-grade steel, and the filter means 23 thereby being acted upon on its outside with pressure. The cylindrical vault-structured filter means 23 has a particularly dimensionally stable behaviour, because this load direction is identical to the pressure load by means of which the bulge-structuring or vault-structuring process was initiated and carried out. Although the supporting elements of the bulge-structuring or vault-structuring process no longer have to be present, the folds 9 and 10 already present have a virtually self-stiffening action with respect to external pressure load. The two lower images show diagrammatically the deformation of the bulge-structured or vault-structured filter means 23 when, by a reversal of flow (see the arrows), the pressure load takes place from inside and, consequently, the solid or filter cake (not illustrated explicitly in FIG. 7) which has accreted on the outside of the filter means 23 can be removed. In the lower image on the left, the internal action of pressure is still low, so that the troughs 8 of the bulge or vault structures are flattened only somewhat. In the lower image on the right, the internal pressure action is so high that the troughs 8 of the bulge or vault structures are punctured from the inside outwards and, consequently, the solid or filter cake which has accreted on the outside can be thrown off in an accelerated manner. With a renewed reversal of flow in order to restore the normal operating state, the filter means 23 resumes its original configuration completely or at least approximately, in a similar way to the upper image. Alternatively, in FIG. 7, three-dimensionally wave-shaped structures may be used instead of the bulge or vault structures. The use of these three-dimensionally wave-shaped structures with their smoothly rounded beads 22 (not illustrated explicitly in FIG. 7) is advantageous particularly when a dynamic puncturing of the spherical caps 21 occurs according to the arrangement of the image at bottom right and in this case the material of the filter means is to be subjected to only little load. The endurance limit (Wohler curve) of the structured filter means can thereby be improved considerably. In a further version, which is likewise not illustrated explicitly in FIG. 7, the supporting elements 7, which were used for generating the bulge-structured or vault-structured or three-dimensionally wave-shaped structured material web of the filter means 23, may remain as a filter support in the filter means 23. Thus, the external pressure action, for example due to higher flow velocities and/or as a result of a thicker filter cake, can be increased considerably. In this way, the time interval between two cleaning operations can be prolonged and/or the thickness of the filter means wall can be reduced. Thus, even nettings or fabrics consisting of materials, such as textiles or inorganic fibrous tissues, which have low dimensional rigidity, may be employed. In a further version, which is likewise not illustrated explicitly in FIG. 7, screen walls and filter supports are equipped with bulge or vault structures or with three-dimensionally wave-shaped or three-dimensionally facet-shaped structures.

Figure 8:
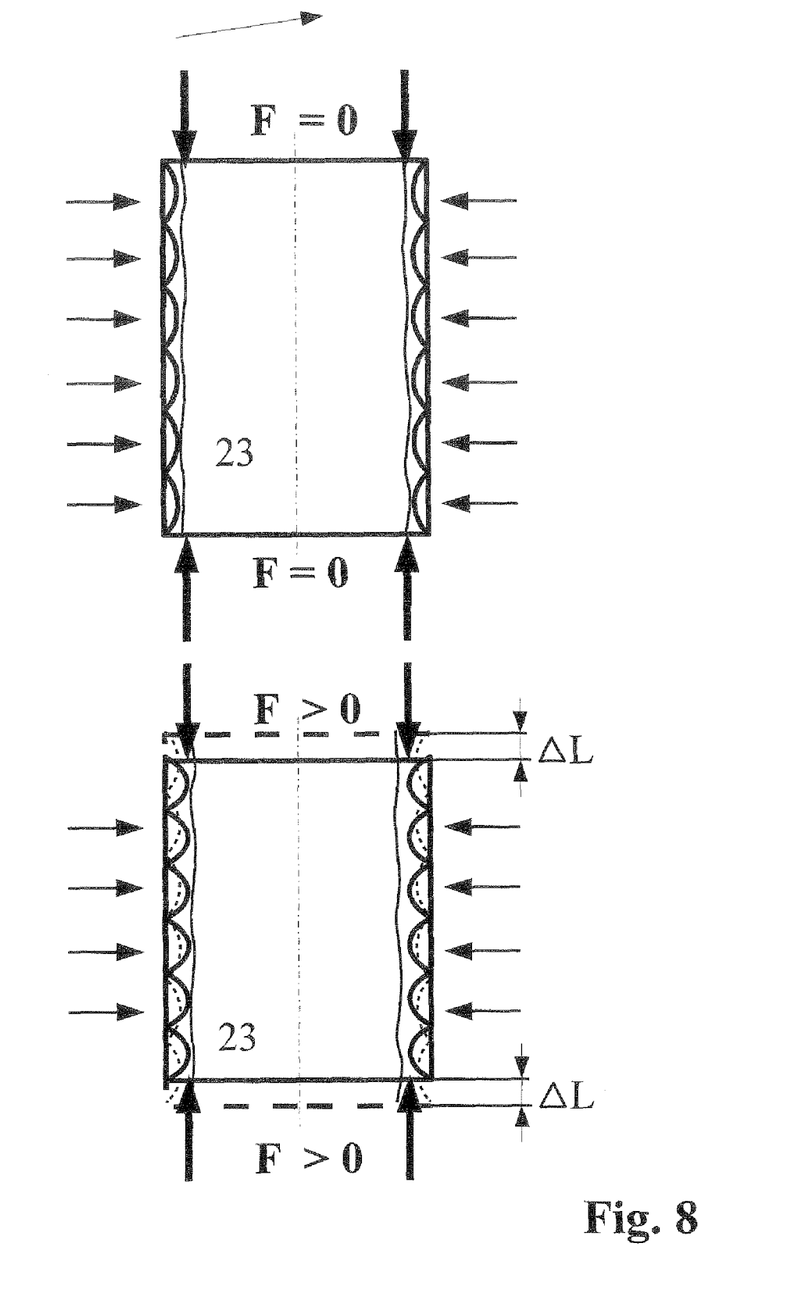
FIG. 8 shows diagrammatically a cross section through a vault-structured or three-dimensionally wave-shaped structured cylinder, in particular consisting of filter means, through which the flow passes radially from outside and which is thereby acted upon by pressure, and in which, in the upper image, no force yet acts axially on its two end faces, and in which, in the lower image, a force is active axially on its two end faces, with an axial compression of the cylinder.

FIG. 8 illustrates diagrammatically in two images a cross section through a cylindrical bulge-structured or vault-structured filter means 23. The horizontal arrows in these two images illustrate, for example, a uniform direction of flow of a fluid during the normal operation of the filter, the direction of the active pressure not changing. The upper image illustrates this normal operating state of the filter means, the fluid medium to be filtered flowing from the outside inwards through the filter means 23, preferably consisting of an elastic netting composed of high-grade steel, and solid particles being capable of settling on the outside of the filter means 23 in the form of a filter cake. The latter is not illustrated explicitly in FIG. 8.

The bulge-structured or vault-structured filter means 23 may be deformed in the axial direction, without in this case buckling, because it possesses a compensatory effect on account of its multi-dimensional and offset bulge or vault structures. Due to an axial load (F>0), the bulge-structured or vault-structured filter means 23 is shortened at its two ends by the amount of a length difference ΔL and, after the removal of the axial load, is deformed in reverse again completely or at least approximately. In contrast to this, under axial deformation, a non-structured filter means would easily become unstable and buckle. This axial instability does not occur, in particular, in a bulge-structured or vault-structured cylindrical filter means 23 consisting preferably of netting or fabric, because a bulge-structured or vault-structured material web, because of its structures, already has a compensatory behaviour in its wall direction, and, furthermore, because in nettings and fabrics, because of the ability whereby their fibres can become interlaced, this compensatory action is further reinforced. In this case, the high radial dimensional rigidity of a cylindrical or conical or other preferably rotationally symmetrically curved bulge-structured or vault-structured filter means is not impaired.

The axial deformation of the bulge-structured or vault-structured filter means 23 may be implemented by means of an intermittent or even oscillating load (F>0). This may even happen, without the actual operation of the filter in this case being interrupted. Alternatively, instead of the bulge-structured or vault-structured filter means 23, a three-dimensionally wave-shaped structured filter means may also be used, particularly when a high endurance limit of the material used is to be achieved. In a further version, which is not illustrated explicitly in FIG. 8, three-dimensionally facet-shaped structured filter means which may be equipped with folds or beads can also be used, because these likewise have a compensatory behaviour.

Furthermore, during the flow over the three-dimensionally facet-shaped structured walls, the near-wall flow is steered back and forth to an increased extent as a result of the facet surfaces 15 inclined with respect to one another. The rinsing-free effect is thereby reinforced. In a further version, which is likewise not illustrated explicitly in FIG. 8, screen walls and filter supports are equipped with bulge or vault structures or with three-dimensionally wave-shaped or three-dimensionally facet-shaped structures.

Figure 9:
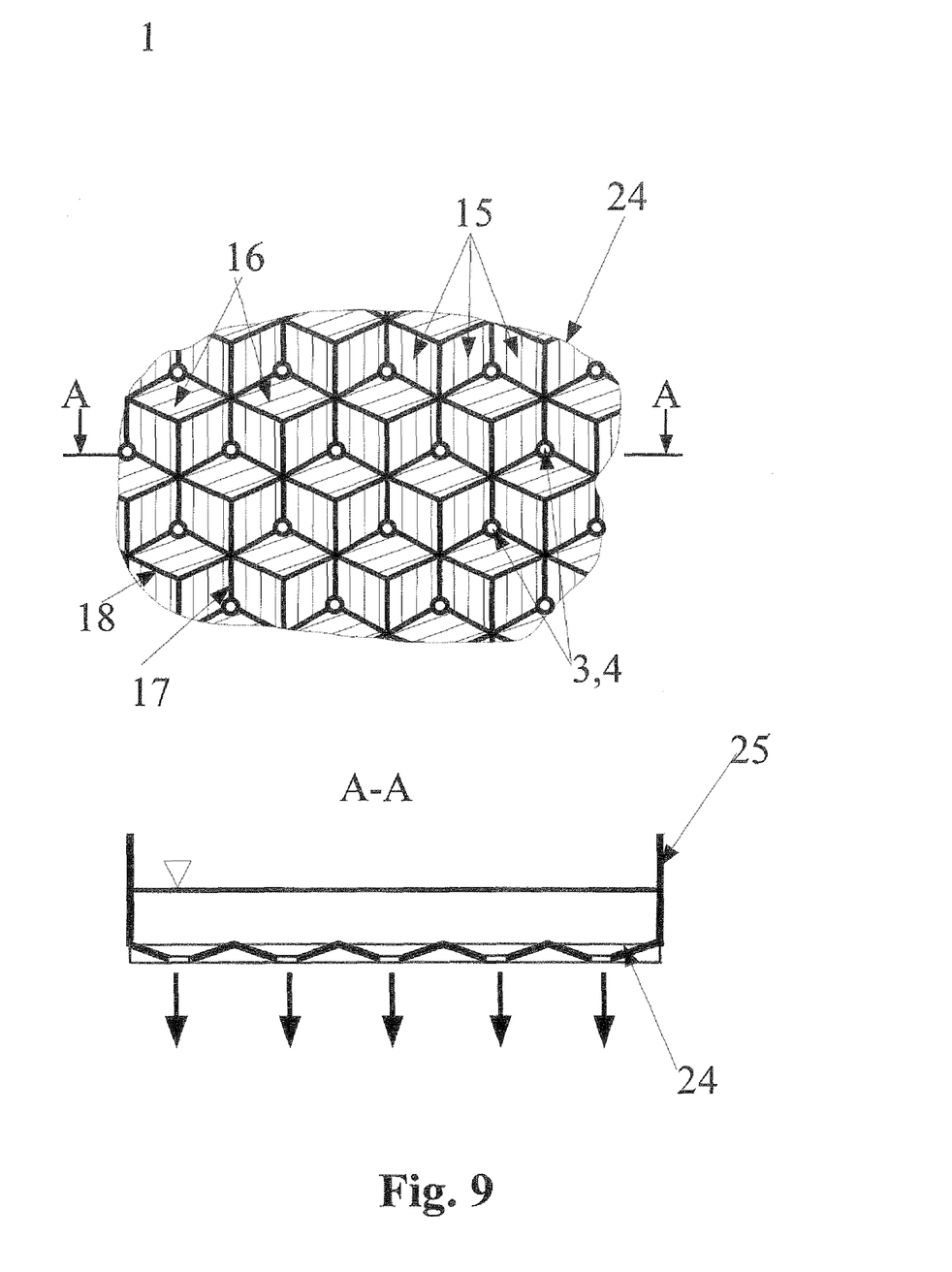
FIG. 9 shows diagrammatically a top view of a detail of a three-dimensionally facet-shaped structured distributor bottom, in the upper image, and a cross section through a device with a vault-structured distributor bottom, in the lower image, for a uniform apportionment of fluid media streams.

FIG. 9 illustrates diagrammatically a top view of a detail of a three-dimensionally facet-shaped structured distributor bottom 24, in the upper image, and a cross section through an element 25 with the three-dimensionally facet-shaped structured distributor bottom 24, in the lower image, for a uniform apportionment of fluid media streams. The vertical arrows in the lower image indicate the direction of flow of the apportioned fluid quantity streams which are not illustrated explicitly. In a further embodiment, which is not illustrated explicitly in this figure, the element illustrated in FIG. 9 is modified. First, the holes in the lower image are closed, and the structured bottom is filled up from above only to an extent such that the surface of the fluid medium is exactly flush with the upper edge of the folds or beads of the facet-shaped structured material web. This takes place preferably in that the excess fluid quantity is removed with the aid of a wiper before the holes in the structured distributor bottom 24 are opened.

The features of the invention disclosed in the present description, claims and abstract may be significant both individually and in any combination for realizing the invention in its various embodiments.

What is claimed is:

1. A method for producing a structured material web from a web material, wherein the method comprises the following steps:

providing a web material, forming holes in the web material, executing a primary structuring process where a three-dimensional structuring of the web material is formed comprising beads or folds as well as structures formed in a surface portion which is enclosed by the beads or the folds, namely troughs that are enclosed by the folds in the case of a vault structure and spherical caps that are enclosed by the beads in the case of a three-dimensional wave-shaped structure, and executing a secondary structuring process where a three-dimensional facet-shaped structuring of the web material with spatially arranged plane or only slightly curved facet surfaces is formed in the enclosed surfaces portions by acting with pressure upon the troughs or spherical caps on their convex side and pressing the troughs or spherical caps on their concave side against supporting elements which converge to a star point whereby the troughs or spherical caps are pressed in between the supporting elements, wherein one of the holes in each case is arranged at a distinguished location, namely the lowest location, in each of the structures formed as facet surfaces in the enclosed surface portions, and wherein the enclosed surface portion at every other location of the surface portion is formed with an inclination towards the distinguished location.

2. The method according to claim 1, characterized in that the three-dimensional structuring of the web material during the primary structuring process is formed by means of a controlled self-organization.

3. The method according to claim 1, characterized in that the troughs or spherical caps are being acted upon with pressure on their convex side by an elastic pressure roller or by means of a fluidic active medium.

4. The method according to claim 1, characterized in that the facet surfaces are formed with a pyramidal configuration.

5. The method according to claim 4, characterized in that an elevated pyramidal tip is formed.

6. The method according to claim 1, at least one of the preceding claims, characterized in that the facet surfaces are in each case equipped with a plurality of holes.

7. The method according to claim 1, characterized in that the web material formed by a three-dimensional facet-shaped structuring is bent to a drum configuration in such a way that the holes in the distinguished location of the facet surfaces are arranged together on the outer radius or on the inner radius of the drum configuration.

8. The method according to claim 1, characterized in that the web material formed by the three-dimensional facet-shaped structuring does not buckle during shaping into a curved configuration.

9. The method according to claim 1, characterized in that the web material consists of a netting material, a fabric material or a textile material.

10. The method according to claim 1, characterized in that the web material consists of the following group of materials: metal fibres, plastic fibres, natural fibres, carbon fibres, glass fibres, cardboard and paper.

11. The method according to claim 1, characterized in that an anti-stick coating or an anti-stick surface is formed on the surface of the web material, in particular according to the type of a lotus effect, wherein the anti-stick coating or the anti-stick surface is formed before or after the holing process or before or after the three-dimensional structuring.

* * * * *